United States Patent [19]

Meyer

[11] 4,336,713
[45] Jun. 29, 1982

[54] COMPENSATED TEMPERATURE SENSING DEVICE

[75] Inventor: Arthur S. Meyer, West Chester, Ohio

[73] Assignee: The United States of America as represented by the Secretary of the Air Force, Washington, D.C.

[21] Appl. No.: 175,794

[22] Filed: Aug. 6, 1980

[51] Int. Cl.³ .............................................. G01K 1/22
[52] U.S. Cl. ................................ 374/197; 60/39.28 R
[58] Field of Search ................. 73/362.4, 368.2, 368.6, 73/368.7, 367.5; 60/39.28 R, 513, 523, 524

[56] References Cited

U.S. PATENT DOCUMENTS 2,710,886  6/1955  Randall ......................... 73/362.5 X
2,809,492 10/1957  Arkawy .
3,085,398  4/1963  Ingleson .
3,377,848  4/1968  Marvin .
3,453,573  7/1969  Kyle .
3,483,750 12/1969  Pratt .
3,509,768  5/1970  Reynolds et al. .
3,789,665  2/1974  Hohenberg .
4,055,997 11/1977  Kniat .................................. 73/117.3

Primary Examiner—Kyle L. Howell
Assistant Examiner—Joseph W. Roskos
Attorney, Agent, or Firm—Donald J. Singer; Jacob N. Erlich

[57] ABSTRACT

A compensated temperature sensing device having a sensing element capable of surviving extreme operating environments while still being able to substantially instantaneously sense temperature changes. This is accomplished by incorporating within the device an auxiliary heat source which artificially heats the sensing gas within the sensing device. The amount of heat added to the device would be dependent upon the error in the sensed to actual temperature and the mass of the sensor which requires a change in temperature level.

9 Claims, 1 Drawing Figure

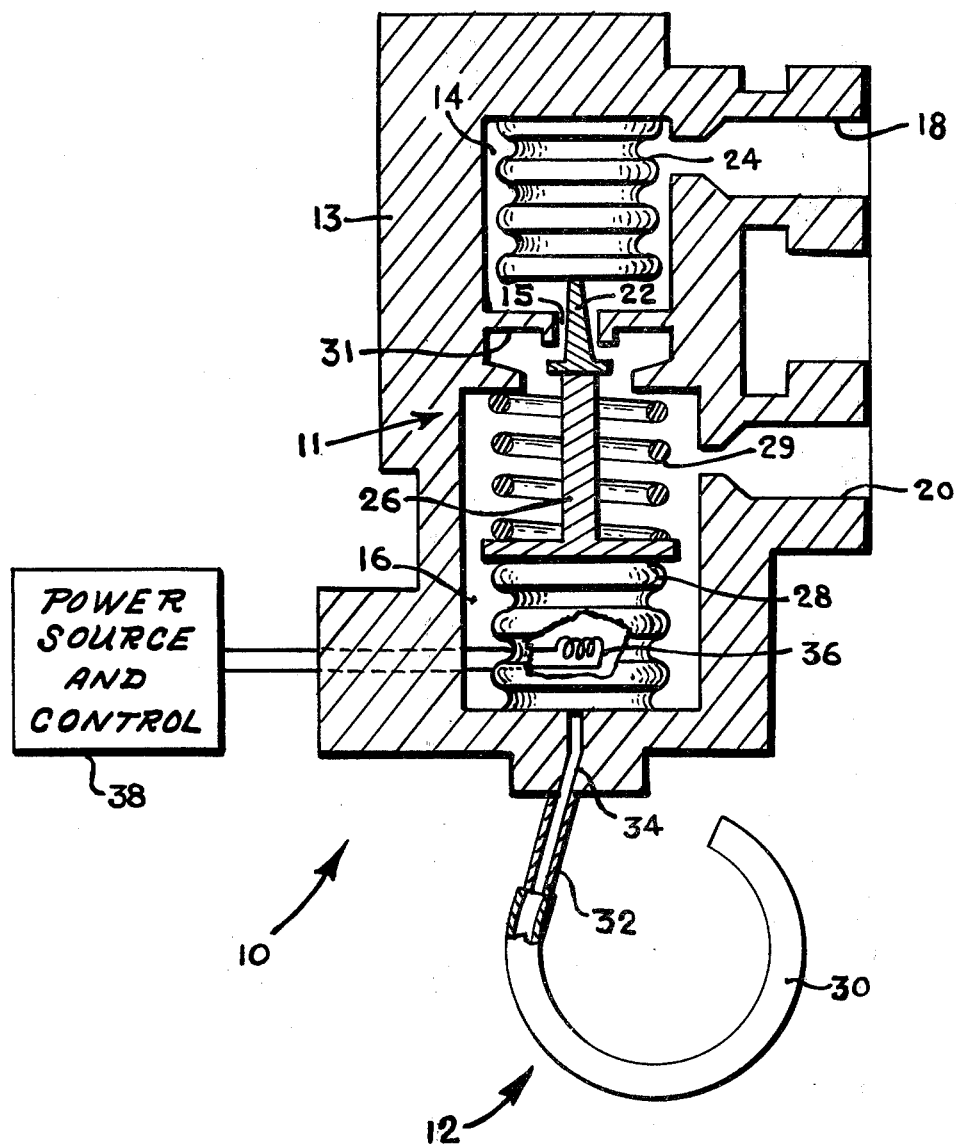

COMPENSATED TEMPERATURE SENSING DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to temperature sensing devices, and, more particularly to a temperature sensing device which is capable of providing substantially instantaneous response to temperature changes.

There are many requirements for a temperature sensing device which is capable of substantially instantaneously providing an indication of temperature changes. For example, the operation of many currently available jet engines is directly linked to variations in temperatures in various parts of the engine. In the F101 jet engine, the entire control thereof is accomplished by the engine automatically responding to the pilot's command and specific parameters measured by the engine control system.

The engine control system regulates three engine parameters which are influenced by the temperature of the air entering the compressor of the engine. These parameters are engine speed, compressor variable stator vane position and acceleration fuel flow. Each of these three fundamental engine parameters is greatly affected by compressor inlet temperature. If, during engine transient operation the temperature sensor cannot vary its temperature signal output as rapidly as the actual temperature variances, the control system of the engine will incorrectly schedule the three parameters noted above.

The effect of an error in sensed compressor inlet temperature has the greatest impact upon compressor stator vane scheduling and thus the stall margin of the compressor. For example, at a mid range operating point, a 10° F. sensed error can result in the stators being 0.8 degrees off schedule. This is 50% of the entire tolerance band for the entire control system and engine. Thus it is evident that if the air temperature is changing at a rate of 100° F. per second, the temperature sensor must be extremely quick reacting or the engine must be very tolerant of scheduling errors. For high performance aircraft, however, neither of the above statements is true.

The speed at which a temperature sensor can sense a change in air temperature is generally proportional to the density of the air passing over the sensor. The response of the sensor to a step change in air pressure is called the "time constant". This means that with an instantaneous change in temperature (a step input), the sensor output will be approximately 63% of the change in one time constant. At a typical idle condition (20 lb/sec/sq ft) it takes one second for the sensor to respond to only 63% of the real temperature change. Consequently, this is a major limiting feature in the acceleration of a jet engine. Therefore, with a sensor capable of reacting almost instantaneous with a temperature change, the jet engine could accelerate substantially faster.

It is therefore apparent that a temperature sensing device capable of substantially instantaneously providing an output indicative of temperature changes would be extremely beneficial in increasing the efficiency of jet engines or, for that matter, any other device which is dependent upon such temperature changes for its operation. Unfortunately, such sensors are currently unavailable since not only must these sensors respond rapidly to temperature changes, they must also (1) be able to mechanically survive the jet engine operating environment; (2) sense the steady state temperature within the accuracy required for the control system of the jet engine (this requirement is 1.0% per degree Rankine; and (3) respond to a change in compressor inlet temperature rapidly enough such that the resulting errors in sensor output do not result in engine parameter scheduling errors which are detrimental to the engine operation. In other words, such a sensor must be strong, accurate and fast. Unfortunately, from a design and mechanization standpoint, the requirement that the sensor be strong is in opposition to the requirement that the sensor be fast; that is, a large mass takes substantially more heat (BTU's) to change its temperature than a small mass.

SUMMARY OF THE INVENTION

The instant invention overcomes the problems encountered in the past by providing a compensated temperature sensing device which is extremely sensitive to changes in surrounding temperature.

The temperature sensor of this invention is made up of two sections, a bulb section and a transducer. The bulb section is placed in the area for which the temperature is to be sensed. This bulb is filled with a pressurized gas such as helium. As the helium in the sensing bulb is heated or cooled, its pressure level changes. The pressure level of the bulb is transmitted through a small tube into a bellows in the transducer section of the sensor. Within the transducer section, the pressure level of the helium pushes against the bellows, with the force required to resist that push being proportional to the temperature of the helium. The sensor changes the bellows force level to a hydraulic pressure level which is then used by a system, such as an engine control system, associated with the sensor for scheduling.

In order to substantially increase the response time of the sensor, the sensor of this invention heats the helium within the bulb or bellows faster than the heat can be conducted through the walls of the bulb. This is accomplished by providing an electrical heating element within the bellows in order to supplement the heat coming through the walls of the bulb. The amount of heat to be added to the bellows is dependent upon (1) the error in the sensed to actual air temperature and (2) the mass of the sensor which needs to have its temperature level changed.

It is therefore an object of this invention to provide a temperature sensing device which is capable of substantially instantaneously providing an output indicative of surrounding temperature changes.

It is another object of this invention to provide a compensated temperature sensing device which will allow the thin material bulb of past sensors to be replaced with a thicker more rugged bulb.

It is a further object of this invention to provide a compensated temperature sensing device which is more durable than past sensors.

It is a still further object of this invention to provide a compensated temperature sensing device which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWING

The only FIGURE of the drawing is a side elevational view of the compensated temperature sensing device of this invention shown partly in cross section.

DETAILED DESCRIPTION OF THE PREFERRED EMBODIMENT

Reference is now made to the only FIGURE of the drawing which shows in a side elevational view and partly in cross section the compensated temperature sensing device 10 of this invention. Temperature sensing device 10 although primarily utilized for providing a signal indicative of variances in temperature within the compressor inlet of a jet engine (not shown), temperature sensing device can be utilized with any system in which an output indicative of temperature variations is to be sensed.

Compensated temperature sensing device 10 is made up of a transducer section 11 and a bulb section 12. The transducer section 12 is formed within a housing 13 having a pair of chambers 14 and 16 therein interconnected by a metering orifice 15. Chamber 14 is connected by means of a hydraulic input port 18 to any suitable source of hydraulic fluid (not shown) which supplies hydraulic fluid to chambers 14 and 16. Chamber 16 is interconnected by way of hydraulic output port 20 to any suitable device (not shown) which is capable of receiving a signal in accordance with a change of pressure. The pressure between chambers 14 and 16 is regulated by the position of a metering element 22 in the form of, for example, a tapered member mounted within metering orifice 15.

Metering element 22 is affixed at one end thereof to a bellows 24 situated within chamber 14. The other end of metering element 22 is affixed by means of an extension rod 26 to another bellows 28 located within chamber 16. Additionally, any suitable biasing means such as spring 29 is interposed between bellows 28 and an upper wall 31 of chamber 16. The pressure applied to evacuated bellows 24 produces a net force which combined with spring 29 acts as a countering force to the change in position of bellows 28.

Bulb section 12 is affixed to housing 13 and includes a temperature sensing bulb 30 in the form of a coiled tubular element. Bulb 30 is affixed by means of a tube 32 to chamber 16 of housing 13. This is accomplished by tube 32 being in alignment with a port 34 within housing 13. Port 34 directly connects the interior of bellows 28 to the interior of bulb 30.

The bulb section 12, although being depicted directly adjacent housing 13 can be extended therefrom, if desired, and placed in the area in which the temperature is to be sensed. For example, bulb section 12 may be placed in the air flow path upstream of the compressor inlet of a jet engine.

Bulb 30 is generally made of a zirconium tube approximately 7 inches long, ¼ inches in outer diameter with 0.007 inch wall thickness and bent into the shape of a coil. Bulb 30 is filled with pressurized helium. The purpose of using zirconium for the bulb material is that it has the lowest value of density and specific heat of any known structural material. That is, it requires the lowest number of BTU's to heat it from one value to another. Similarly, the helium is utilized since it has the highest conductivity of any known gas. This combination produces a fast response bulb.

Unfortunately, even such a response may be inadequate for the desired purpose of controlling a jet engine. Therefore an additional heat source, in the form of a resistance heater element or electrical heating coil 36 is situated within bellows 28. Heater element 36 is controlled by any suitable source of electricity formed as part of a conventional power source and control 38 operably connected thereto.

Since the geometry and metalurgical properties of zirconium require that the coil or bulb 30 be epoxied rather than welded, brazed or soldered in place, and since epoxy has a finite temperature limit which is near the operating temperatures experienced in, for example, a jet engine, the utilization of heating element 36 as in this invention removes the need for limiting the bulb material to zirconium. Consequently, if desired, bulb 30 can be manufactured from normal stainless steel which has conventional welding properties.

Referring more specifically now to the operation of the compensated temperature sensing device 10 of this invention, as the helium in sensing bulb 30 is heated or cooled by the surrounding temperature, its pressure level changes. The helium is contained in an almost constant volume. The pressure level of bulb 30 is transmitted through tube 32 and port 34 into bellows 28 in transducer section 11 of temperature sensing device 10. The pressure level of the helium within bellows 28 and bulb 30 pushes bellows 28 against spring 29 and bellows 24. The force required to resist that push is proportional to the temperature of the helium.

The positioning of bellows 28 alters the positioning of metering element 22 within metering orifice 15 and therefore regulates the flow of fluid through metering orifice 15. The hydraulic pressure level registered between output port 18 and 20 is indicative of the temperature change and can be utilized for controlling an aircraft or other device or system operably connected to the temperature sensing device 10 of this invention.

When an increase in air temperature surrounding bulb 30 occurs, the time constant of the temperature sensing device 10 can be decreased by adding supplemental heat inside bellows 28 by heating element 36. The pressure in the bellows 28 increases because sensing bulb 30 is getting hotter and supplemental heat is being supplied within bellows 28. As the pressure increases in bellows 28, it expands and reduces the area of metering orifice 15. This increases the hydraulic pressure drop and that pressure is sensed by an engine control system, for example, as an increase in air temperature.

The amount of heat to be added to the temperature sensing device 10 of this invention is dependent upon the error in the sensed to actual temperature and the mass of the sensor. The transducer section 11 of sensor 10 does not need to be at the same temperature level as bulb section 12. Also, the amount of heat needed to be added internally to the helium within sensor 10 can be approximated in a number of ways. For example, in a jet engine, the amount of heat added may be dependent upon change in power lever angle, rate of change of the helium pressure level, engine speed error or an arbitrary input.

Although the above discussion of this invention refers to a compensated temperature sensing device 10 in which it is essential to speed up the sensor in the increasing temperature direction, the temperature sensing device 10 of this invention can also be used to speed up the sensor in the decreasing temperature direction. This is accomplished by supplying supplemental heat even during steady state operation. Thus bulb 30 is always hotter than ambient temperature. To speed up sensing a change in temperature in the decreasing direction, it is merely necessary to turn off the supplementary heat source 38.

Although this invention has been described with reference to a particular embodiment, it will be understood to those skilled in the art that this invention is also capable of further and other embodiments within the spirit and scope of the appended claims.

I claim:

1. A compensated temperature sensing device comprising means for sensing the temperature adjacent thereto, said temperature sensing means including a tubular element and a gas contained therein wherein a change in said temperature alters the pressure of said gas, said altered pressure providing a first signal responsive to said temperature change, means operably connected to said temperature sensing means for providing a second signal representative of said first signal, and means operably associated with said temperature sensing means and said second signal providing means for substantially increasing the speed at which said second signal is indicative of said temperature change sensed by said temperature sensing means whereby said second signal virtually instantaneously provides an indication of said temperature change.

2. A compensated temperature sensing device as defined in claim 1 wherein said second signal providing means comprises a housing, a bellows situated within said housing, the interior of said bellows being operably connected to said tubular element and said bellows also containing said gas therein whereby the position of said bellows within said housing is determined by said pressure of said gas and is representative of said temperature change.

3. A compensated temperature sensing device as defined in claim 2 wherein means for substantially increasing the speed at which said second signal is indicative of said change in said temperature comprises means for controlling the temperature of said gas.

4. A compensated temperature sensing device as defined in claim 3 wherein said temperature controlling means is located within said bellows.

5. A compensated temperature sensing device as defined in claim 4 wherein said temperature controlling means is in the form of a heater element.

6. A compensated temperature sensing device as defined in claim 1 wherein said tubular element is made of steel.

7. A compensated temperature sensing device as defined in claim 2 wherein said second signal providing means further comprises a first and a second chamber within said housing, said first and said second chambers being interconnected by a metering orifice, said bellows being located in said first chamber, another bellows being located in said second chamber, a metering element interconnecting said pair of bellows and extending through said metering orifice, means operably connected to said second chamber for providing fluid to said housing, means operably connected to said first chamber for permitting said fluid to leave said housing, said flow of fluid leaving said housing being regulated by the position of said metering element in said metering orifice, said position of said metering element being dependent upon the position of said bellows in said first chamber whereby the pressure of said flow of fluid leaving said housing is indicative of said temperature change.

8. A compensated temperature sensing device as defined in claim 7 wherein means for substantially increasing the speed at which said second signal is indicative of said change in said temperature comprises means for controlling the temperature of said gas.

9. A compensated temperature sensing device as defined in claim 8 wherein said temperature controlling means is located within said bellows within said first chamber.

* * * * *